United States Patent Office 2,727,059
Patented Dec. 13, 1955

2,727,059

HIGH MOLECULAR WEIGHT ADDUCTS

Joseph E. Fields, Dayton, Ohio, assignor to Monsanto Chemical Company, St. Louis, Mo., a corporation of Delaware No Drawing. Application November 27, 1951,
Serial No. 258,519

19 Claims. (Cl. 260—465.4)

The present invention relates to high molecular weight adducts of a polyhalomethane, with mixtures of acrylates and acrylonitrile or methacrylonitrile.

According to the invention there are provided new and highly valuable liquid mixtures of adducts in which one mole of a polyhalomethane compound having the formula $ZCX_3$ in which X is selected from the class consisting of chlorine and bromine and Z is selected from the class consisting of hydrogen, chlorine and bromine, is combined with a total of from 10 to 100 moles of acrylonitrile or methacrylonitrile and an alkyl acrylate of from 4 to 11 carbon atoms, the percentage composition of said nitrile-alkyl acrylate total being from 0.5 to 50.0 mole per cent acrylonitrile or methacrylonitrile and from 99.5 to 50.0 mole per cent of the alkyl acrylate. The present liquid mixtures of adducts may also be characterized as low molecular weight copolymers of acrylonitrile or methacrylonitrile and alkyl acrylates in which the copolymer chain has been terminated by addition to both ends of said chain of the polyhalomethane constituents.

Depending upon the nature of the individual acrylate, nitrile and polyhalomethane, as well as upon the ratio of acrylate to nitrile present, the halomethane-nitrile-alkyl acrylate adducts have molecular weights, generally, of from 2,000 to 20,000. They are liquid mixtures of adducts in which one mole of the polyhalomethane is in chemical combination with alkyl acrylate-acrylonitrile or alkyl acrylate-methacrylonitrile copolymers of varying chain lengths, each of the adducts present in said liquid mixtures being a compound containing halogen, cyano, and carboxylate substituents.

As disclosed in the copending application of Howard K. Nason, Serial No. 263,489 filed December 26, 1951, the present liquid mixtures of adducts are particularly valuable as softeners or plasticizers for synthetic rubber-like substances.

Polyhalomethanes suitable for the preparation of the liquid mixture of adducts are, e. g., carbon tetrachloride, carbon tetrabromide, chloroform, bromoform, bromotrichloromethane, chlorotribromomethane, dichlorodibromomethane, etc. Alkyl acrylates which may be employed include, e. g., methyl, ethyl, propyl, isopropyl, butyl, isobutyl, sec-butyl, tert-butyl, amyl, isoamyl, tert-amyl, sec-amyl, hexyl, heptyl, 2-ethylhexyl or n-octyl acrylate. A mixture of different acrylates may be employed. Thus, adducts may be prepared by reacting one of the present polyhalomethanes with a mixture of acrylonitrile, a lower alkyl acrylate such as isopropyl acrylate and a higher alkyl acrylate such as octyl acrylate, whereby there are formed halogen-containing addition products in which there are present cyano, isopropyl and octyl radicals.

The present adducts are readily obtainable by contacting the halomethane compound with the mixture of alkyl acrylate and acrylonitrile or methacrylonitrile at ordinary or increased temperatures in the presence of a free-radical-liberating agent as catalyst until formation of the adducts has taken place. The reaction may be effected by mixing together the halomethane, ester, nitrile and catalyst and maintaining the resulting mixture, advantageously with agitation, at a temperature which permits steady decomposition of the catalyst and consequent steady liberation of halomethyl free-radicals. Or, if desired, the ester and nitrile may be added gradually, e. g., dropwise, to the halomethane, while constantly maintaining an optimum quantity of active catalyst in the reaction zone, which zone is preferably kept at a temperature conducive to the formation of free-radicals. Depending upon the nature of the individual reactants and catalyst and the properties desired in the final product, increased temperatures, e. g., temperatures of from above room temperature to about 125° C. may be generally employed. The reaction time may vary from, say, several hours to several days. Variation of catalyst quantity has been found to have a definite effect on the nature of the adduct. While catalyst quantities of up to 10%, based on total weight of ester and nitrile, may be used, I have found that generally a catalyst range of from 0.1% to 5% is preferable. The use of the greater proportions of catalyst within this range tends to favor formation of the lower molecular-weight adducts, and the use of lower quantities of catalyst tends to favor formation of the high molecular-weight adducts, i. e., adducts having a molecular weight of from, say, 6,000 to 10,000. The average molecular weight of the adducts is also influenced by other variables, e. g., ratio of ester to nitrile, ratio of the mixture of nitrile and ester to halomethane, temperature, etc. It is important that the ratio of nitrile to ester does not exceed one, i. e., the present useful, liquid products are not formed when the molar quantity of acrylonitrile or methacrylonitrile present exceeds that of the acrylate.

Formation of the present adducts probably proceeds through a chain mechanism, with termination of the chain at an early stage, i. e., at a point at which no more than a total of 100 moles of the ester and nitrile have added to one mole of the halomethane. Depending upon the nature and the quantity of the reactants and of the free-radical-liberating agent, as well as upon the reaction conditions, chain propagation may be terminated at various stages to yield products in which from 10 to 100 moles of the total of the ester and nitrile have added to one mole of the polyhalomethane compound.

An extraneous, inert solvent or diluent, e. g., benzene or hexane may be employed, either to serve as catalyst solvent, to mitigate reaction heat, or to dilute the concentration of the ester in the reaction mixture. The use of such a solvent or diluent, however, is generally of little economic advantage.

Free-radical-liberating agents which may be employed in promoting addition of the present acrylates and nitriles to the polyhalomethanes are compounds which will decompose to give free radicals. Such compounds include peroxygen-type catalysts, for example, acyl peroxides such as acetyl, benzoyl, lauroyl, or stearoyl peroxides; hydrocarbon peroxides or hydroperoxides such as di-tert-butyl peroxide, di-tert-amyl peroxide, tert-butyl hydroperoxide, cumene hydroperoxide or p-cymene hydroperoxide; and inorganic per-compounds such as hydrogen peroxide, sodium peroxide, sodium perborate, potassium persulfate, and alkali percarbonates; hydrazine derivatives such as hydrazine hydrochloride and dibenzoyl hydrazine; organometallic compounds such as tetraethyl lead, etc. For convenience, the peroxygen type catalysts will be hereinafter referred to as peroxidic compounds. Only catalytic quantities of the free-radical-liberating agent need be employed in promoting the addition reaction. Ultra-violet light may be employed with the catalyst or as the sole catalytic agent.

The present adducts differ essentially from previously obtained copolymers of alkyl acrylates and acrylonitrile or methacrylonitrile in that they are halogen-containing, low-molecular weight materials, i. e., the average molecular weight of the present adducts is less than 20,000; and in that they are viscous liquids rather than solid or semi-solid materials.

The invention is further illustrated, but not limited, by the following examples.

Example 1

This example shows the preparation of adducts of carbon tetrachloride with mixtures of butyl acrylate and acrylonitrile, employing benzoyl peroxide as catalyst. The reaction was effected by mixing 0.9 mole (138.3 g.) of carbon tetrachloride with the quantities of ester, acrylonitrile and catalyst indicated in the table below and maintaining flasks of the resulting mixtures on a rotating rack at 43 R. P. M. at a temperature of 95° C. for 48 hours. At the end of that time unreacted material was removed by distilling through a 10" Vigreux column. The residues were adducts having the C, H, Cl and N contents and the molecular weights shown below:

| Expt. No. | Reactants | | | | | Product | | | | |
|---|---|---|---|---|---|---|---|---|---|---|
| | Butyl Acrylate | | Acrylonitrile | | $Bz_2O_2$, g. | Percent C | Percent H | Percent Cl | Percent N | M. W. |
| | Mol. | g. | Mol. | g. | | | | | | |
| 1 | .24 | 30.7 | .06 | 3.2 | 0.678 | 65.25 | 8.90 | 2.89 | 2.95 | 4,907 |
| 2 | .24 | 30.7 | .06 | 3.2 | 1.695 | 64.34 | 8.70 | 3.71 | 2.58 | 3,823 |
| 3 | .21 | 26.9 | .09 | 4.8 | 0.634 | 65.34 | 8.51 | 2.04 | 4.52 | 6,952 |
| 4 | .21 | 26.9 | .09 | 4.8 | 1.585 | 65.01 | 8.47 | 2.86 | 4.17 | 4,959 |
| 5 | .18 | 23.0 | .12 | 6.4 | 0.588 | 65.59 | 8.43 | 2.13 | 6.02 | 6,658 |
| 6 | .18 | 23.0 | .12 | 6.4 | 1.470 | 65.57 | 8.04 | 2.08 | 7.03 | 6,818 |
| 7 | .27 | 34.6 | .03 | 1.6 | 1.81 | 63.38 | 8.46 | 3.94 | 1.30 | 3,599 |
| 8[1] | .24 | 30.7 | .06 | 3.2 | 1.7 | | | 3.80 | | 3,732 |
| 9 | .24 | 30.7 | .06 | 3.2 | 1.7 | | | 3.52 | 2.25 | 4,029 |
| 10[2] | .24 | 30.7 | .06 | 3.2 | .002 | 65.55 | 8.57 | 1.12 | 2.86 | 9,497 |

[1] 1.2 mole $CCl_4$ used.
[2] 0.9 mole of $CHCl_3$ used instead of the $CCl_4$.

The above analyses shown that the products are adducts in which one mole of carbon tetrachloride (or chloroform in Experiment 10) was combined with the number of moles of butyl acrylate and acrylonitrile shown below:

| Expt. No. | Acrylate | | Acrylonitrile | |
|---|---|---|---|---|
| | Moles | Mole percent | Moles | Mole percent |
| 1 | 32.8 | 76.1 | 10.3 | 23.9 |
| 2 | 25.7 | 78.5 | 7.04 | 21.5 |
| 3 | 43.8 | 66.2 | 22.4 | 33.8 |
| 4 | 31.4 | 68.0 | 14.8 | 32.0 |
| 5 | 38.9 | 57.6 | 28.6 | 42.4 |
| 6 | 37.8 | 52.5 | 34.2 | 47.5 |
| 7 | 25.5 | 88.4 | 3.34 | 11.6 |
| 9 | 25.6 | 81.0 | 6.47 | 19.0 |
| 10 | 65.1 | 73.0 | 19.4 | 23.0 |

Example 2

Employing the procedure described in Example 1 except that methacrylonitrile was used instead of acrylonitrile and that the reaction time was 25 hours instead of the 48 hours of Example 1, the following experiments were made.

The above analyses show that the products are adducts in which one mole of carbon tetrachloride has combined with the number of moles of butyl acrylate and methacrylonitrile shown below:

| Expt. No. | Acrylate | | Methacrylonitrile | |
|---|---|---|---|---|
| | Moles | Mole percent | Moles | Mole percent |
| 1 | 73.02 | 91.2 | 7.06 | 8.8 |
| 2 | 36.28 | 81.6 | 8.17 | 18.4 |
| 3 | 48.8 | 69.6 | 21.3 | 30.4 |
| 4 | 38.5 | 54.5 | 32.1 | 45.5 |

Operating as in the above examples other tri- or tetra halomethanes may be similarly reacted with a mixture of alkyl acrylates, acrylonitrile and methacrylonitrile to yield adducts having an average molecular weight of below 20,000. Also instead of using butyl acrylate there may be used other alkyl acrylates in which the alkyl radical has from 1 to 8 carbon atoms. Instead of employing benzoyl peroxide other peroxidic compounds or other free-radical liberating agents may be used as catalysts.

What I claim is:

1. A liquid mixture of adducts in which one mole of a polyhalomethane compound having the formula $ZCX_3$ in which X is selected from the class consisting of chlorine and bromine and Z is selected from the class consisting of hydrogen, chlorine and bromine has added to a copolymer having an average molecular weight of 2,000 to 20,000, said copolymer consisting of an alkyl acrylate of from 4 to 11 carbon atoms copolymerized with a nitrile selected from the class consisting of acrylonitrile and methacrylonitrile and the percentage composition of said copolymer being from 0.5 to 50.0 mole per cent of said nitrile and from 99.5 to 50.0 mole per cent of said acrylate.

2. A liquid mixture of adducts in which one mole of carbon tetrachloride has added to a copolymer having an average molecular weight of 2,000 to 20,000, said copolymer consisting of an alkyl acrylate of from 4 to 11 carbon atoms copolymerized with a nitrile selected from the class consisting of acrylonitrile and methacrylonitrile, and the percentage composition of copolymer being from 0.5 to

| Expt. No. | Reactants | | | | | Products | | | | |
|---|---|---|---|---|---|---|---|---|---|---|
| | Butyl Acrylate | | Methacrylonitrile | | $Bz_2O_2$, g. | Percent C | Percent H | Percent Cl | Percent N | M. W. |
| | Mol. | g. | Mol. | g. | | | | | | |
| 1 | .27 | 34.6 | .03 | 2.0 | 1.83 | 63.80 | 8.81 | 1.42 | .99 | 9,987 |
| 2 | .24 | 30.7 | .06 | 4.0 | 1.735 | 65.38 | 8.52 | 2.65 | 2.14 | 5,352 |
| 3 | .21 | 26.9 | .09 | 6.0 | 1.645 | 66.45 | 8.81 | 1.81 | 3.81 | 7,835 |
| 4 | .18 | 23.0 | .12 | 8.2 | 1.56 | 66.97 | 8.13 | 1.96 | 6.21 | 7,236 |

50.0 mole per cent of said nitrile and from 99.5 to 50.0 mole per cent of said acrylate.

3. A liquid mixture of adducts in which one mole of chloroform has added to a copolymer having an average molecular weight of 2,000 to 20,000, said copolymer consisting of an alkyl acrylate of from 4 to 11 carbon atoms copolymerized with a nitrile selected from the class consisting of acrylonitrile and methacrylonitrile, and the percentage composition of said copolymer being from 0.5 to 50.0 mole per cent of said nitrile and from 99.5 to 50.0 mole per cent of said acrylate.

4. A liquid mixture of adducts in which one mole of a polyhalomethane compound having the formula $ZCX_3$ in which X is selected from the class consisting of chlorine and bromine and Z is selected from the class consisting of hydrogen, chlorine and bromine has added to a copolymer having an average molecular weight of 2,000 to 20,000, said copolymer consisting of acrylonitrile copolymerized with an alkyl acrylate of from 4 to 11 carbon atoms, and the percentage composition of said copolymer being from 0.5 to 50.0 mole per cent of said nitrile and from 99.5 to 50.0 mole per cent of said acrylate.

5. A liquid mixture of adducts in which one mole of a polyhalomethane compound having the formula $ZCX_3$ in which X is selected from the class consisting of chlorine and bromine and Z is selected from the class consisting of hydrogen, chlorine and bromine has added to a copolymer having an average molecular weight of 2,000 to 20,000, said copolymer consisting of methacrylonitrile copolymerized with an alkyl acrylate of from 4 to 11 carbon atoms, and the percentage composition of said copolymer being from 0.5 to 50.0 mole per cent of said nitrile and from 99.5 to 50.0 mole per cent of said acrylate.

6. A liquid mixture of adducts in which one mole of carbon tetrachloride has added to a copolymer having an average molecular weight of 2,000 to 20,000, said copolymer consisting of acrylonitrile copolymerized with an alkyl acrylate of from 4 to 11 carbon atoms, and the percentage composition of said copolymer being from 0.5 to 50.0 mole per cent of said nitrile and from 99.5 to 50.0 mole per cent of said acrylate.

7. A liquid mixture of adducts in which one mole of carbon tetrachloride has added to a copolymer having an average molecular weight of 2,000 to 20,000, said copolymer consisting of methacrylonitrile copolymerized with an alkyl acrylate of from 4 to 11 carbon atoms, and the percentage composition of said copolymer being from 0.5 to 50.0 mole per cent of said nitrile and from 99.5 to 50.0 mole per cent of said acrylate.

8. A liquid mixture of adducts in which one mole of chloroform has added to a copolymer having an average molecular weight of 2,000 to 20,000, said copolymer consisting of acrylonitrile copolymerized with an alkyl acrylate of from 4 to 11 carbon atoms, and the percentage composition of said copolymer being from 0.5 to 50.0 mole per cent of said nitrile and from 99.5 to 50.0 mole per cent of said acrylate.

9. A liquid mixture of adducts in which one mole of carbon tetrachloride has added to a copolymer having an average molecular weight of 2,000 to 20,000, said copolymer consisting of acrylonitrile copolymerized with butyl acrylate, and the percentage composition of said copolymer being from 0.5 to 50.0 mole per cent of said nitrile and from 99.5 to 50.0 mole per cent of said acrylate.

10. A liquid mixture of adducts in which one mole of carbon tetrachloride has added to a copolymer having an average molecular weight of 2,000 to 20,000, said copolymer consisting of methacrylonitrile copolymerized with butyl acrylate, and the percentage composition of said copolymer being from 0.5 to 50.0 mole per cent of said nitrile and from 99.5 to 50.0 mole per cent of said acrylate.

11. The process which comprises contacting, in the presence of a free-radical liberating agent, a polyhalomethane compound having the formula $ZCX_3$ in which X is selected from the class consisting of chlorine and bromine and Z is selected from the class consisting of hydrogen, chlorine and bromine with a mixture of an alkyl acrylate of from 4 to 11 carbon atoms and a nitrile selected from the class consisting of acrylonitrile and methacrylonitrile and recovering from the resulting reaction product a liquid mixture of adducts in which one mole of said polyhalomethane has added to a copolymer having an average molecular weight of 2,000 to 20,000, said copolymer consisting of said acrylate copolymerized with said nitrile, and the percentage composition of said copolymer being from 0.5 to 50.0 mole per cent of said nitrile and from 99.5 to 50.0 mole per cent of said acrylate.

12. The process which comprises contacting carbon tetrachloride, in the presence of a free-radical liberating agent, with a mixture of an alkyl acrylate of from 4 to 11 carbon atoms and a nitrile selected from the class consisting of acrylonitrile and methacrylonitrile and recovering from the resulting reaction product a liquid mixture of adducts in which one mole of said carbon tetrachloride has added to a copolymer having an average molecular weight of 2,000 to 20,000, said copolymer consisting of said acrylate copolymerized with said nitrile, the percentage composition of said copolymer being from 0.5 to 50.0 mole percent of said nitrile and from 99.5 to 50.0 mole per cent of said acrylate.

13. The process which comprises contacting chloroform, in the presence of a free-radical liberating agent, with a mixture of an alkyl acrylate of from 4 to 11 carbon atoms and a nitrile selected from the class consisting of acrylonitrile and methacrylonitrile and recovering from the resulting reaction product a liquid mixture of adducts in which one mole of said chloroform has added to a copolymer having an average molecular weight of 2,000 to 20,000, said copolymer consisting of said acrylate copolymerized with said nitrile, and the percentage composition of said copolymer being from 0.5 to 50.0 mole per cent of said nitrile and from 99.5 to 50.0 mole per cent of said acrylate.

14. The process which comprises contacting, in the presence of a free-radical liberating agent, a polyhalomethane compound having the formula $ZCX_3$ in which X is selected from the class consisting of chlorine and bromine and Z is selected from the class consisting of hydrogen, chlorine and bromine with a mixture of an alkyl acrylate of from 4 to 11 carbon atoms and acrylonitrile and recovering from the resulting reaction product a liquid mixture of adducts in which one mole of said polyhalomethane compound has added to a copolymer having an average molecular weight of 2,000 to 20,000, said copolymer consisting of said acrylate copolymerized with said nitrile, and the percentage composition of said copolymer being from 0.5 to 50.0 mole per cent of said nitrile and from 99.5 to 50.0 mole per cent of said acrylate.

15. The process which comprises contacting, in the presence of a free-radical liberating agent, a polyhalomethane compound having the formula $ZCX_3$ in which X is selected from the class consisting of chlorine and bromine and Z is selected from the class consisting of hydrogen, chlorine and bromine with a mixture of an alkyl acrylate of from 4 to 11 carbon atoms and methacrylonitrile, and recovering from the resulting reaction product a liquid mixture of adducts in which one mole of said polyhalomethane compound has added to a copolymer having an average molecular weight of 2,000 to 20,000, said copolymer consisting of said acrylate copolymerized with said nitrile, and the percentage composition of said copolymer being from 0.5 to 50.0 mole per cent of said nitrile and from 99.5 to 50.0 mole per cent of said acrylate.

16. The process which comprises contacting carbon tetrachloride, in the presence of a peroxidic catalyst, with a mixture of acrylonitrile and an alkyl acrylate of from 4 to 11 carbon atoms, and recovering from the resulting reaction product a liquid mixture of adducts in which one mole of the carbon tetrachloride has added to a copolymer having an average molecular weight of 2,000 to 20,000, said copolymer consisting of said nitrile copolymerized with said acrylate, and the percentage composition of said copolymer being from 0.5 to 50.0 mole per cent of said nitrile and from 99.5 to 50.0 mole per cent of said acrylate.

17. The process which comprises heating carbon tetrachloride, in the presence of benzoyl peroxide, with a mixture of acrylonitrile and butyl acrylate, and recovering from the resulting reaction product a liquid mixture of adducts in which one mole of the carbon tetrachloride has added to a copolymer having an average molecular weight of 2,000 to 20,000, said copolymer consisting of said acrylate copolymerized with said nitrile, and the percentage composition of said copolymer being from 0.5 to 50.0 mole per cent of said nitrile and from 99.5 to 50.0 mole per cent of said acrylate.

18. The process which comprises heating chloroform, in the presence of benzoyl peroxide, with a mixture of acrylonitrile and butyl acrylate, and recovering from the resulting reaction product a liquid mixture of adducts in which one mole of the chloroform has added to a copolymer having an average molecular weight of 2,000 to 20,000, said copolymer consisting of said acrylate copolymerized with said nitrile, and the percentage composition of said copolymer being from 0.5 to 50.0 mole per cent of said nitrile and from 99.5 to 50.0 mole per cent of said acrylate.

19. The process which comprises heating carbon tetrachloride, in the presence of benzoyl peroxide, with a mixture of methacrylonitrile and butyl acrylate, and recovering from the resulting reaction product a liquid mixture of adducts in which one mole of the carbon tetrachloride has added to a copolymer having an average molecular weight of 2,000 to 20,000, said copolymer consisting of said acrylate copolymerized with said nitrile, and the percentage composition of said copolymer being from 0.5 to 50.0 mole per cent of said nitrile and from 99.5 to 50.0 mole per cent of said acrylate.

References Cited in the file of this patent

UNITED STATES PATENTS

| | | |
|---|---|---|
| 2,123,599 | Fikentscher et al. | July 12, 1938 |
| 2,440,800 | Handford et al. | May 4, 1948 |
| 2,471,959 | Hunt | May 31, 1949 |
| 2,561,516 | Ladd et al. | July 24, 1951 |
| 2,588,398 | Mast et al. | Mar. 11, 1952 |

OTHER REFERENCES

Mast et al.: Abstract of S. N. 48,543, 657 O. G. 1584-5.